US012790440B2

(12) United States Patent
Lee et al.

(10) Patent No.: US 12,790,440 B2
(45) **Date of Patent: *Nov. 10, 2026**

(54) METHOD FOR PREPARING PRE-HYDROLYZED POLYSILICATE

(71) Applicant: LG CHEM, LTD., Seoul (KR)

(72) Inventors: Kyu Reon Lee, Daejeon (KR); Kyoung Shil Oh, Daejeon (KR)

(73) Assignee: LG CHEM, LTD., Seoul (KR)

( * ) Notice: Subject to any disclaimer, the term of this patent is extended or adjusted under 35 U.S.C. 154(b) by 598 days.

This patent is subject to a terminal disclaimer.

(21) Appl. No.: 18/281,740

(22) PCT Filed: Jun. 7, 2022

(86) PCT No.: PCT/KR2022/008033

§ 371 (c)(1),
(2) Date: Sep. 12, 2023

(87) PCT Pub. No.: WO2022/260410

PCT Pub. Date: Dec. 15, 2022

(65) Prior Publication Data

US 2024/0199812 A1 Jun. 20, 2024

(30) Foreign Application Priority Data

Jun. 8, 2021 (KR) ........................ 10-2021-0074291

(51) Int. Cl.
*C08G 77/02* (2006.01)

(52) U.S. Cl.
CPC .................................... *C08G 77/02* (2013.01)

(58) Field of Classification Search
CPC ...................................................... C08G 77/02
See application file for complete search history.

(56) References Cited

U.S. PATENT DOCUMENTS

| | | | | |
|---|---|---|---|---|
| 4,017,528 | A | 4/1977 | Unger et al. | |
| 4,547,557 | A | 10/1985 | Mcdaniel | |
| 5,223,030 | A | 6/1993 | Valette et al. | |
| 2011/0240907 | A1 | 10/2011 | Sharma et al. | |
| 2019/0330423 | A1* | 10/2019 | Lee | C08G 77/06 |
| 2021/0206923 | A1* | 7/2021 | Lee | C08J 9/28 |

FOREIGN PATENT DOCUMENTS

| | | | | |
|---|---|---|---|---|
| CN | 104556064 | A * | 4/2015 | |
| CN | 108463486 | A | 8/2018 | |
| CN | 109320722 | A | 2/2019 | |
| CN | 112135860 | A | 12/2020 | |
| EP | 3778712 | A1 | 2/2021 | |
| JP | S59-64671 | A | 4/1984 | |
| JP | 2000-178020 | A | 6/2000 | |
| JP | 2000160098 | A | 6/2000 | |
| JP | 4369200 | B2 | 11/2009 | |
| JP | 2014-501320 | A | 1/2014 | |
| JP | 2015-189661 | A | 11/2015 | |
| JP | 6260916 | B2 | 1/2018 | |
| JP | 2021138896 | A | 9/2021 | |
| KR | 10-1064869 | B1 | 9/2011 | |
| KR | 10-1942474 | B1 | 1/2019 | |
| KR | 10-2054846 | B1 | 12/2019 | |
| KR | 10-2020-0062506 | A | 6/2020 | |
| WO | WO-2020111765 | A1 * | 6/2020 | C08J 9/28 |

OTHER PUBLICATIONS

CN104556064 English Translation, prepared May 13, 2026. (Year: 2026).*

Liu, "Preparation of High Purity Porous Silica Microspheres by Reverse Phase Suspension System," Bulletin of the Chinese Ceramic Society, vol. 33, No. 9, pp. 2370-2374, 2380 (2014); DOI: 10.16552/j.cnki.issn1001-1625.2014.09.22, English Abstract and English figure legends provided.

Mehner et al., "Mechanical and chemical properties of thick hybrid sol-gel silica coatings from acid and base catalyzed sols," Journal of Sol-Gel Science and Technology, vol. 54, No. 3, pp. 355-362 (2010); DOI: 10.1007/s10971-010-2203-z.

* cited by examiner

*Primary Examiner* — Christopher M Rodd
(74) *Attorney, Agent, or Firm* — Bryan Cave Leighton Paisner LLP

(57) ABSTRACT

Provided is a method for preparing a prehydrolyzed polysilicate in which a polysilicate is applied as a reactant during synthesizing a prehydrolyzed polysilicate, and the polysilicate is hydrated in the presence of an alcohol-based compound formed through the hydration of a compound of Formula 1 without the injection of a separate alcohol-based solvent:

$$R_1—Si—(OR_2)_3 \quad \text{[Formula 1]}$$

wherein: $R_1$ is an alkyl of 1 to 20 carbon atoms, cycloalkyl of 3 to 20 carbon atoms, or vinyl of 1 to 20 carbon atoms; and each $R_2$ is independently an alkyl of 1 to 20 carbon atoms.

13 Claims, No Drawings

METHOD FOR PREPARING PRE-HYDROLYZED POLYSILICATE

CROSS-REFERENCE TO RELATED APPLICATIONS

The present application is a national stage Application of International Application No. PCT/KR2022/008033 filed on Jun. 7, 2022, which claims the benefit of priority based on Korean Patent Application No. 10-2021-0074291, filed on Jun. 8, 2021, the entire contents of which are incorporated herein by reference.

TECHNICAL FIELD

The present invention relates to a method of preparing a pre-hydrolyzed polysilicate, not needing a separate reaction solvent during the reaction.

BACKGROUND ART

Aerogel is a super porous material of a high specific surface area (≥500 $m^2/g$), having a porosity of 90-99.9% and a pore size in a range of 1-100 nm, and is a material having excellent ultralight/super thermal insulation/ultra-low dielectric properties, and application research as an eco-friendly high temperature-type insulation material, a ultra-low dielectric thin film for a highly integrated device, a catalyst, a catalyst carrier, an electrode for a super capacitor, an electrode material for seawater desalination as well as research for developing an aerogel raw material are being actively conducted.

The biggest advantage of the aerogel is super-insulation showing a thermal conductivity of 0.300 W/m·K or less that is lower than an organic insulation such as the conventional styrofoam, and solving the fire vulnerability and the generation of harmful gases in case of fire, that are fatal defects of the organic insulation.

Generally, aerogel is prepared by preparing wet gel from a silica precursor such as water glass, and alkoxysilane series (TEOS, TMOS, MTMS, etc.), and removing liquid components in the wet gel without destruction of microstructures. Typical types of silica aerogel can be divided into three types: a powder, a granule, and a monolith type, and generally, a powder type.

Particularly, among the silica precursors, tetraethyl orthosilicate (TEOS) is a material used in a variety of industrial fields including the manufacture of a coating material, an insulation material, a porous ceramic, etc., and various products including pure TEOS, condensed TEOS, pre-hydrolyzed TEOS (HTEOS), etc., are on sale in the market.

Among them, HTEOS is an ethyl polysilicate oligomer material having broad molecular weight distribution. When synthesizing an oligomer type from a TEOS monomer, physical properties such as gelation time can be controlled, and easy application can be possible according to the reaction conditions of a user. In addition, there are advantages of forming a final resultant material with reproducible physical properties.

The HTEOS is generally synthesized by partial hydration reaction and condensation reaction in acidic conditions with respect to an alkoxysilane-based monomer compound such as TEOS. In this case, the condensation reaction is performed by reflux reaction in acidic conditions, but the rate of condensation is too slow, and the condensation reaction needs to be performed for a long time to achieve a desired level of a condensation degree. Accordingly, there are problems in that high energy cost is incurred, and the efficiency of a process is degraded, and there are problems in that the cost of the raw material of the alkoxysilane-based monomer compound such as TEOS, used as the reactant, is high, which increases the manufacturing cost. Meanwhile, in order to increase the condensation rate, a condensation catalyst can be used. However, in this case, the control of the molecular weight of a reaction product is difficult, the purchase cost of a catalyst is incurred, and a catalyst separation process is additionally performed in the synthesis step. Accordingly, there are defects in that the process is more complicated, and the manufacturing cost increases.

Thus, a method of synthesizing a pre-hydrolyzed polysilicate, by which the condensation reaction could be omitted, a process is simple, and the manufacturing cost could be markedly reduced by not using an alkoxysilane-based monomer compound such as TEOS but using a polysilicate, when compared to the preparation method using the conventional TEOS, has been suggested.

In the method using a polysilicate as the reactant, a method of reacting a polysilicate with an acidic aqueous solution using ethanol as a solvent was used. The use of an amphipathic (amphiphilic) solvent such as ethanol is essentially required, because layer separation occurs when applying an acidic aqueous solution to polysilicate.

According to the reaction, the reaction of a polysilicate and water is performed according to the use of the amphipathic solvent such as ethanol, and a final product is obtained in a diluted type of a hydrated polysilicate in ethanol.

PRIOR ART DOCUMENTS

Patent Documents (Patent Document 1) Japanese Published Patent Publication based on PCT application No. 2014-501320 (published on 2014 Jan. 20)

(Patent Document 2) Korean Laid-open Patent No. 2020-0062506 (2020 Jun. 4)

BRIEF DESCRIPTION

Technical Problem

A task to solve in the present invention is to provide a method of preparing a pre-hydrolyzed polysilicate, by which a polysilicate is applied as the reactant for synthesizing a pre-hydrolyzed polysilicate, and a separate reaction solvent is not necessary during the reaction.

Technical Solution

In order to solve the above problems, the present invention provides a method for producing pre-hydrolyzed polysilicate.

(1) The present invention provides a method of preparing a pre-hydrolyzed polysilicate, which comprises injecting a polysilicate and a compound of Formula 1 into a reactor (step 1); further injecting an acidic aqueous solution to the reactor to prepare a reaction mixture (step 2); and stirring the reaction mixture to perform hydration reaction (step 3):

$$R_1—Si—(OR_2)_3 \quad \text{[Formula 1]}$$

wherein $R_1$ is an alkyl of 1 to 20 carbon atoms, a cycloalkyl of 3 to 20 carbon atoms, or a vinyl of 1 to 20 carbon atoms, and each $R_2$ is independently an alkyl of 1 to 20 carbon atoms.

(2) The present invention provides the method of preparing a pre-hydrolyzed polysilicate according to (1), wherein the compound of Formula 1 is hydrated to form an alcohol compound of Formula 2 and a silanol compound of Formula 3:

$R_2$—OH [Formula 2]

$R_1$—Si—$(OH)_3$ [Formula 3]

wherein $R_1$ is an alkyl of 1 to 20 carbon atoms, a cycloalkyl of 3 to 20 carbon atoms, or a vinyl of 1 to 20 carbon atoms, and $R_2$ is an alkyl of 1 to 20 carbon atoms.

(3) The present invention provides the method of preparing a pre-hydrolyzed polysilicate according to (1) or (2), wherein the hydration of the polysilicate in step 3 is performed in the presence of an alcohol compound of Formula 2 formed by the hydration of the compound of Formula 1:

$R_2$—OH [Formula 2]

wherein $R_2$ is an alkyl of 1 to 20 carbon atoms.

(4) The present invention provides the method of preparing a pre-hydrolyzed polysilicate according to any one of (1) to (3), wherein $R_1$ and $R_2$ are each independently an alkyl of 1 to 6 carbon atoms.

(5) The present invention provides the method of preparing a pre-hydrolyzed polysilicate according to any one of (1) to (4), wherein the compound of Formula 1 is alkyltrialkoxysilane.

(6) The present invention provides the method of preparing a pre-hydrolyzed polysilicate according to any one of (1) to (5), wherein the polysilicate and the compound of Formula 1 have a Si molar ratio of 6:1 to 15:1.

(7) The present invention provides the method of preparing a pre-hydrolyzed polysilicate according to any one of (1) to (6), wherein the acidic aqueous solution comprises 0.005 to 0.20 parts by weight of an acid catalyst based on 100 parts by weight of the polysilicate.

(8) The present invention provides the method of preparing a pre-hydrolyzed polysilicate according to any one of (1) to (7), wherein the polysilicate has an average degree of polymerization of 3 to 30.

(9) The present invention provides the method of preparing a pre-hydrolyzed polysilicate according to any one of (1) to (8), wherein step 3 is performed for 30 minutes to 2 hours in conditions of 15 to 25 °C

(10) The present invention provides the method of preparing a pre-hydrolyzed polysilicate according to any one of (1) to (9), wherein a separate alcohol solvent is not injected in addition to the polysilicate and the compound of Formula 1 to the reactor in the preparation method of a pre-hydrolyzed polysilicate.

(11) The present invention provides the method of preparing a pre-hydrolyzed polysilicate according to any one of (1) to (10), wherein the polysilicate comprises one or more selected from the group consisting of methyl polysilicate, ethyl polysilicate, propyl polysilicate, isopropyl polysilicate, butyl polysilicate, sec-butyl polysilicate, tert-butyl polysilicate, hexyl polysilicate, cyclohexyl polysilicate, and dodecyl polysilicate.

(12) The present invention provides the method of preparing a pre-hydrolyzed polysilicate according to any one of (1) to (11), wherein the compound of Formula 1 comprises one or more selected from the group consisting of alkyltriethoxysilane and alkyltrimethoxysilane.

(13) The present invention provides the method of preparing a pre-hydrolyzed polysilicate according to any one of (1) to (12), wherein the compound of Formula 1 is methyltriethoxysilane.

(14) The present invention provides the method of preparing a pre-hydrolyzed polysilicate according to any one of (1) to (13), wherein the compound of Formula 1 is alkyltriethoxysilane, the alkyltriethoxysilane is hydrated to form an alkylsilanol and ethanol, and the hydration of the polysilicate in step 3 is performed in the presence of the ethanol formed by the hydration of the alkyltriethoxysilane.

Advantageous Effects

According to the method of preparing a pre-hydrolyzed polysilicate according to the present invention, a polysilicate is applied as the reactant for synthesizing a pre-hydrolyzed polysilicate, and different from a preparation method using an alkoxysilane-based monomer compound as the reactant, condensation reaction can be omitted to markedly reduce synthesis time, and since a separate reaction solvent is not needed during the reaction, this method could be usefully used in case of performing the reaction in conditions not wanting a solvent, or obtaining a pre-hydrolyzed polysilicate in a high concentration.

DETAILED DESCRIPTION

Hereinafter, the present invention will be explained in more detail to assist the understanding of the present invention. In this case, it will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor can properly define the meaning of the words or terms to best explain the invention.

The method of preparing a pre-hydrolyzed polysilicate according to an embodiment of the present invention comprises: injecting a polysilicate and a compound of Formula 1 into a reactor (step 1); further injecting an acidic aqueous solution into the reactor to prepare a reaction mixture (step 2); and stirring the reaction mixture to perform a hydration reaction (step 3):

$R_1$—Si—$(OR_2)_3$ [Formula 1]

wherein $R_1$ is an alkyl of 1 to 20 carbon atoms, a cycloalkyl of 3 to 20 carbon atoms, or a vinyl of 1 to 20 carbon atoms, and each $R_2$ is independently an alkyl of 1 to 20 carbon atoms.

Generally, if a monomer compound such as a pre-hydrolyzed TEOS is used as a silica precursor used for preparing silica aerogel or silica aerogel blanket, the control of the molecular weight of a final product or the time of gelation reaction time is difficult, and stability is deteriorated. Accordingly, a pre-hydrolyzed polysilicate oligomer having a molecular weight of about 1000 is prepared and used. Different from a monomer such as TEOS, if the material of an oligomer type is used, the stability could be secured though a hydration degree is increased for controlling the gelation reaction time. However, in the conventional synthesis process of the pre-hydrolyzed polysilicate, an alkoxysilane-based monomer compound such as a TEOS monomer was used as the reactant, and condensation reaction was required after partial hydration. In this case, the condensation reaction is performed through reflux reaction in acidic conditions, but a condensation rate is too slow. Accordingly, in order to achieve a desired level of the degree of condensation, the condensation reaction is performed for a long time, and there are problems of incurring high energy cost, the deterioration of process efficiency, and the increase of the manufacturing cost, because the raw material cost of the alkoxysilane-based monomer compound such as TEOS used as the reactant is high. Meanwhile, in order to increase the condensation rate, a condensation catalyst can be used, but in this case, the control of the molecular weight of a reaction product is difficult, the cost for purchasing the catalyst is incurred, and a catalyst separation process is additionally required in a synthesis step, and there are problems in that the process becomes more complicated, and the manufacturing cost increases.

However, according to the method of preparing a pre-hydrolyzed polysilicate of the present invention, an alkoxysilane-based monomer compound such as TEOS is not used as the reactant, but a polysilicate is used, and only a partial hydration step is included, condensation reaction is omitted to increase the efficiency of a synthesis process, and the raw material cost is relatively low to obtain economic feasibility in view of the manufacturing cost. In addition, by using a method for easily controlling the gelation reaction time and a weight average molecular weight through the control of the content and pH of an acid catalyst, a pre-hydrolyzed polysilicate having excellent storage stability could be synthesized. In addition, in the method of preparing a pre-hydrolyzed polysilicate of the present invention, a separate reaction solvent is not necessary during the reaction, and this method could be usefully used in case of performing the reaction in conditions not wanting a solvent, or obtaining a pre-hydrolyzed polysilicate in a high concentration.

Hereinafter, the method of preparing a pre-hydrolyzed polysilicate according to an embodiment of the present invention will be explained in detail by steps.

Step 1

Step 1) of the present invention is a step of injecting the reactants of a polysilicate and a compound of Formula 1 into a reactor:

$$R_1—Si—(OR_2)_3 \qquad \text{[Formula 1]}$$

wherein $R_1$ is an alkyl of 1 to 20 carbon atoms, a cycloalkyl of 3 to 20 carbon atoms, or a vinyl of 1 to 20 carbon atoms, and each $R_2$ is independently an alkyl of 1 to 20 carbon atoms.

In an embodiment of the present invention, particularly, $R_1$ can be an alkyl of 1 to 12 carbon atoms, a cycloalkyl of 3 to 12 carbon atoms, or a vinyl of 1 to 12 carbon atoms, more particularly, an alkyl of 1 to 6 carbon atoms, an alkyl of 1 to 4 carbon atoms, and particularly, each $R_2$ can be independently an alkyl of 1 to 12 carbon atoms, more particularly, an alkyl of 1 to 6 carbon atoms, or an alkyl of 1 to 5 carbon atoms.

In addition, in an embodiment of the present invention, $R_1$ can be an alkyl of 1 to 4 carbon atoms, and $R_2$ can be ethyl.

In the present invention, a polysilicate is used as the reactant, and a condensation reaction in the synthesis process of a pre-hydrolyzed polysilicate can be omitted, and even better silica product yield per unit content can be shown when compared to a case of using an alkoxysilane-based monomer compound as the reactant.

The polysilicate according to an embodiment of the inventive concept can have a silica ($SiO_2$) production yield of 30 wt % or more, particularly, 30 to 45 wt % of the silica production yield. Here, the silica ($SiO_2$) production yield is a value shown by the ratio of the silica content producible from 100 wt % of the polysilicate. A material having a high silica production yield represents the high silica content producible from the same amount, and if the silica production yield is high, a relatively small amount of a raw material could be used to obtain a silica precursor including a desired level of the silica content, and effects of reducing the cost could be achieved.

As the polysilicate used in the present invention, any polysilicate that could form a pre-hydrolyzed polysilicate used as the silica precursor of silica aerogel or aerogel blanket through partial hydration, can be used, without limitation, particularly, an alkyl polysilicate can be used, and more particularly, one or more selected from the group consisting of methyl polysilicate, ethyl polysilicate, propyl polysilicate, isopropyl polysilicate, butyl polysilicate, sec-butyl polysilicate, tert-butyl polysilicate, hexyl polysilicate, cyclohexyl polysilicate, and dodecyl polysilicate, can be used.

In addition, according to an embodiment of the present invention, the polysilicate can have an average degree of polymerization of 3 to 30, particularly, 5 to 15, more particularly, 5 to 12, and particularly, the polysilicate can be an oligomer having the aforementioned degree of polymerization. If the polysilicate satisfies the average degree of polymerization, storage stability and fluidity can be secured, and excellent ease of use can be achieved. In this case, the average degree of polymerization was measured using gel permeation chromatography (GPC, Waters 2489 UV-vis Detector).

The compound of Formula 1 can be hydrated by the water of an acidic aqueous solution injected into the reactor in subsequent step 2) to form an alcohol compound of Formula 2 and a silanol compound of Formula 3. The alcohol compound of Formula 2 can act as an amphipathic (amphiphilic) solvent used for the hydration of the polysilicate in subsequent step 3:

$$R_2—OH \qquad \text{[Formula 2]}$$

$$R_1—Si—(OH)_3 \qquad \text{[Formula 3]}$$

wherein $R_1$ is an alkyl of 1 to 6 carbon atoms, a cycloalkyl of 3 to 6 carbon atoms, or a vinyl of 1 to 6 carbon atoms, $R_2$ is an alkyl of 1 to 6 carbon atoms, and a particular embodiment of $R_1$ and $R_2$ are the same as defined in Formula 1 above.

According to an embodiment of the present invention, the injection amount of the compound of Formula 1 in step 1) can be changed, and the injection amount of the compound of Formula 1 can be determined according to the amount of an alcohol solvent required for the reaction and the silica ($SiO_2$) content included in a finally produced pre-hydrolyzed polysilicate.

The polysilicate and the compound of Formula 1 can have the Si molar ratio of 5:1 to 15:1, and can be used in the molar ratio of 6:1 to 15:1 in view of the concentration of the hydrated polysilicate obtained as the final product, and the silica ($SiO_2$) content included in the finally produced pre-hydrolyzed polysilicate. In addition, the polysilicate and the compound of Formula 1 can particularly have the Si molar ratio of 7:1 to 14:1, 8:1 to 13:1, more particularly, the Si molar ratio of 8:1 to 12:1. The Si molar ratio means the ratio of the mole number of Si included in the polysilicate and the mole number of Si included in the compound of Formula 1. If the Si content of the compound of Formula 1 is excessively small in contrast to the Si content of the polysilicate, the production amount of an alcohol formed by the hydration of the compound of Formula 1 is small, and the amount of the alcohol can be insufficient to suitably hydrate the polysilicate, and if the Si content of the compound of Formula 1 is excessively large in contrast to the Si content of the polysilicate, the production amount of an alcohol formed by the hydration of the compound of Formula 1 is too large, and the concentration of the hydrated polysilicon obtained as the final product can be low. In addition, if the polysilicate and the compound of Formula 1 satisfy the range of the Si molar ratio, the hydration degree of the pre-hydrolyzed polysilicate synthesized can be in a suitable range.

The type of the alcohol compound of Formula 1 produced is not limited as long as it is an alcohol known to be used for the preparation of a pre-hydrolyzed polysilicate, particularly, an alcohol of 1 to 20 carbon atoms, more particularly, an alcohol of 1 to 12 carbon atoms, an alcohol of 1 to 6 carbon atoms, an alcohol of 1 to 5 carbon atoms, can be used.

Step 2

Step 2 according to an embodiment of the present invention is a step for preparing a reaction mixture for partial hydration, and is a step for additionally injecting an acidic aqueous solution into the reactor including the reactants to prepare a reaction product.

In addition, the reaction mixture prepared in step 2) can include water in 2 parts by weight to 42 parts by weight, particularly, 3 parts by weight to 30 parts by weight, more particularly, 3 parts by weight to 20 parts by weight based on 100 parts by weight of the polysilicate.

Here, the acidic aqueous solution is a mixture including an acid catalyst and water, and the water included in the acidic aqueous solution preferentially hydrates the compound of Formula 1 injected in step 1 to form the alcohol compound of Formula 2 and the silanol compound of Formula 3 as described above, and the polysilicate is additionally hydrated using the alcohol compound of Formula 2 thus formed as an amphipathic solvent.

By controlling the amounts of the water and acid catalyst included in the acidic aqueous solution and the pH of the acidic aqueous solution, the hydration degree of the polysilicate can be controlled, and through the control of the hydration degree of the polysilicate, the gelation time and pH of a finally produced pre-hydrolyzed polysilicate can be controlled.

The acidic aqueous solution can include the acid catalyst in 0.005 parts by weight to 0.200 parts by weight, particularly, 0.08 to 0.100 parts by weight, more particularly, 0.010 to 0.090 parts by weight based on 100 parts by weight of the polysilicate reactant.

The amount of the acid catalyst included in the acidic aqueous solution in the present invention is the same as the amount of an acid catalyst in the total of the reaction mixture, and by satisfying the amount of the acid catalyst, a hydration rate during subsequent hydration reaction can be improved, the efficiency of the hydration reaction can be improved even further, and accordingly, the gelation reactivity of the pre-hydrolyzed polysilicate thus synthesized can be improved, the polymerization and condensation reaction of the pre-hydrolyzed polysilicate itself can be suppressed to secure excellent storage stability, and corrosion problems due to an excessive amount of the acid catalyst can be prevented.

The acid catalyst according to an embodiment of the present invention is not specifically limited, but can be one or more selected from the group consisting of hydrochloric acid, nitric acid, acetic acid, sulfuric acid and fluoric acid, preferably, hydrochloric acid.

In addition, the acidic aqueous solution according to an embodiment of the present invention can be an acidic aqueous solution with pH of 1.0 to 2.5, in view of synthesizing a pre-hydrolyzed polysilicate having pH of 0.5 to 2.5, and an optimal hydration degree and gelation reactivity, and if the pH range is satisfied, a pre-hydrolyzed polysilicate having optimal pH and gelation time can be produced.

In addition, the reaction mixture prepared in step 2) can include water in 2 parts by weight to 42 parts by weight, particularly, 3 parts by weight to 30 parts by weight, more particularly, 3 parts by weight to 20 parts by weight based on 100 parts by weight of the polysilicate. If the water is included in an excessively small amount, water is included in a too small amount in contrast to the amount of the polysilicate, and a desired hydration degree could not be achieved during hydration reaction, and if the pre-hydrolyzed polysilicate with a low hydration degree is applied as a silica precursor in the manufacturing process of aerogel, the ratio of a hydroxyl group (—OH) inducing gelation is low, and gelation reaction cannot be performed smoothly. In addition, if the water is excessive, the hydration degree of the finally produced pre-hydrolyzed polysilicate becomes too high, and most alkoxy functional groups of the silica precursor can be substituted with hydroxyl groups, and gelation reaction can arise during the processes of storage and keeping, and viscosity can easily increase to deteriorate storage stability and processability.

In addition, the hydration degree could be controlled by controlling the amounts of the water and acid catalyst in the reaction mixture and the pH of the acidic aqueous solution in step 2), undesired gelation reaction may not arise during the processes of storage and keeping, and excellent storage stability can be secured. The gelation time of the pre-hydrolyzed polysilicate can be controlled according to the above-described variables, and in case of inducing gelation reaction, desired gelation time can be achieved.

Step 3

Step 3 according to an embodiment of the present invention is a step of performing a hydration reaction by stirring the reaction mixture prepared, and is a step of forming a pre-hydrolyzed polysilicate in a partially hydrolyzed state.

Particularly, in step 3) of the present invention, a hydration reaction can be performed by stirring the reaction mixture. The hydration of the polysilicate in step 3) is performed in the presence of the alcohol compound of Formula 2 that is formed by the hydration of the compound of Formula 1 as described above, and in step 3) according to an embodiment of the present invention, the hydration of the acidic aqueous solution with the compound of Formula 1 is performed first in the presence of an acid catalyst.

[Reaction 1]

$$R_1—Si—(OR_2)_3 + 3(H_2O) \xrightarrow{acid} R_1—Si—(OH)_3 + 3(R_2—OH)$$

If only the acidic aqueous solution is applied to the polysilicate, layer separation between the polysilicate and the acidic aqueous solution can arise, and reactivity is not shown. For the reaction between the polysilicate and the acidic aqueous solution, the presence of an amphipathic solvent such as an alcohol is essential. The amphipathic solvent such as the alcohol remains in a final product, and the final product of the pre-hydrolyzed polysilicate is obtained in a diluted state in the amphipathic solvent.

In step 3) according to an embodiment of the present invention, the hydration reaction of the compound of Formula 1 can be preferentially performed by stirring the reaction mixture, and the alcohol compound of Formula 2 is formed. The alcohol compound of Formula 2 acts as the amphipathic solvent between the polysilicate and the acidic aqueous solution to performed the hydration reaction of the polysilicate. In addition, for example, as shown in Reaction 2, according to the hydration reaction of the polysilicate, the hydration reaction of the polysilicate can be performed more easily by an alcohol produced. Accordingly, the present invention may not require the injection of a separate amphipathic solvent, for example, an alcohol solvent for the hydration reaction of the polysilicate in addition to the compound of Formula 1. Accordingly, a separate alcohol solvent for the hydration reaction of the polysilicate is not necessary in the present invention, and accordingly, a pre-hydrolyzed polysilicate with a high concentration can be obtained as a final product.

[Reaction 2]

$$Si_5O_4(OEt)_{12} + n\,H_2O \xrightarrow[R_2—OH,\ acid]{} Si_5O_4(OEt)_{12-n}(OH)_n + n\,EtOH$$

In an embodiment of the present invention, the compound of Formula 1 can include, for example, one or more selected from the group consisting of alkyltriethoxysilane and alkyltrimethoxysilane, particularly, alkyltriethoxysilane, and more particularly, the compound of Formula 1 can be methyltriethoxysilane.

In an embodiment of the present invention, if the compound of Formula 1 is alkyltriethoxysilane, the alkyltriethoxysilane can be hydrated by an acidic aqueous solution injected in step 2 to form alkylsilanol and ethanol, and the hydration of the polysilicate of step 3 can be performed in the presence of the ethanol formed by the hydration of the alkyltriethoxysilane.

In step 3) according to an embodiment of the present invention, a partial hydration reaction can be performed by stirring for 30 minutes to 2 hours at room temperature, particularly, 15 to 25 °C conditions. In the present invention, the polysilicate is used as the reactant, and by performing only the hydration reaction of step 3), a pre-hydrolyzed polysilicate can be synthesized, and condensation reaction essentially required during the synthesis of a pre-hydrolyzed polysilicate by using the conventional alkoxysilane-based monomer compound, is not required, and accordingly, a synthesis process is simple, and relatively low energy cost can be achieved.

The present invention provides a pre-hydrolyzed polysilicate having excellent viscosity properties, storage stability and processability through the synthesis by the preparation method. In addition, the pre-hydrolyzed polysilicate can particularly be a pre-hydrolyzed alkyl polysilicate, more preferably, a pre-hydrolyzed ethyl polysilicate (HTEOS) that has the best utilization as a silica precursor during preparing a silica aerogel or a silica aerogel blanket.

In the present invention, the pre-hydrolyzed polysilicate can mean partially hydrated polysilicate, particularly, polysilicate in a state where partial alkoxy functional groups of the polysilicate are substituted with hydroxyl groups.

Hereinafter, the examples of the present invention will be explained in detail so that a person skilled in the art could easily perform. However, the present invention can be accomplished in various different types and is not limited to the examples explained herein.

Example 1

To a reactor, 10.000 g of ethyl polysilicate (TEOS40, ethyl polysilicate with 40% of $SiO_2$ content) and 0.882 g of methyltriethoxysilane (MTES) as the compound of Formula 1 were injected (Si molar ratio of polysilicate and MTES of 9:1). Then, 0.378 g (HCl: 0.002 g) of a HCl aqueous solution of pH 1.8 was injected to the reactor to prepare a reaction mixture. In this case, a total of 0.376 g of water was included in the reaction mixture prepared. The resultant was stirred at room temperature (20±5 °C) for 1 hour. At the beginning of the reaction, the reactant was opaque, and by the hydration reaction of the MTES, ethanol was produced to be clear, and then, the partial hydration reaction of the ethyl polysilicate was performed. A pre-hydrolyzed ethyl polysilicate (HTEOS) oligomer in ethanol was obtained as a final product.

Examples 2 to 6

By the same method as in Example 1 except the injection amount of the HCl aqueous solution with pH 1.8 was adjusted as shown in Table 1, pre-hydrolyzed ethyl polysilicate (HTEOS) oligomers in ethanol were obtained as final products.

Examples 7 to 12

By the same method as in Example 1 except the injection amount of methyltriethoxysilane (MTES) as the compound of Formula 1 was adjusted as shown in Table 1, pre-hydrolyzed ethyl polysilicate (HTEOS) oligomers in ethanol were obtained as final products.

Example 13

By the same method as in Example 1 except for injecting triethoxy (propyl) silane instead of the methyltriethoxysilane (MTES) as the compound of Formula 1 in an amount shown in Table 1, a pre-hydrolyzed ethyl polysilicate (HTEOS) oligomer in ethanol was obtained as a final product.

Comparative Example 1

To a reactor, 10.000 g of ethyl polysilicate (TEOS40) and 1.209 g of ethanol were injected. Then, 0.243 g (HCl: 0.001 g) of a HCl aqueous solution of pH 1.8 was injected to the reactor to prepare a reaction mixture. The amount of the ethanol was determined as a minimum amount to mix the ethyl polysilicate and the HCl aqueous solution clearly. In this case, total 0.242 g of water was included in the reaction mixture prepared. The resultant was stirred at room temperature (20±5 °C) for 1 hour. A pre-hydrolyzed ethyl polysilicate (HTEOS) oligomer in ethanol was obtained as a final product.

Comparative Examples 2 to 6

By the same method as in Comparative Example 1 except for changing the injection amount of the HCl aqueous solution of pH 1.8 and so the minimum injection amount necessary of the ethanol in Comparative Example 1, pre-hydrolyzed ethyl polysilicate (HTEOS) oligomers in ethanol were obtained as final products.

Reference Example 1

By the same method as in Example 1 except for controlling the injection amount of the methyltriethoxysilane (MTES) as the compound of Formula 1 as shown in Table 1, a pre-hydrolyzed ethyl polysilicate (HTEOS) oligomer in ethanol was obtained as a final product.

Experimental Example

1) Ethanol Produced (g)

The amount of the ethanol produced was calculated using the mole number of water injected for the hydration of the polysilicate.

2) EtOH Content (wt %)

In Examples 1 to 13, the EtOH content (wt %) produced was shown by dividing the mass of ethanol produced by the sum of the reactants.

In addition, in Comparative Examples 1 to 6, the EtOH content (wt %) produced was shown by dividing the sum of the ethanol injected and the ethanol produced by the sum of the reactants.

3) $SiO_2$ Content (wt %)

10 g each of the final products obtained in Examples 1 to 13 and Comparative Examples 1 to 6 was taken, 1 g of ammonia water was added thereto for gelation, and baking was performed at 400 °C for 2 hours to obtain pure $SiO_2$. The mass of $SiO_2$ obtained was measured, and the $SiO_2$ content (wt %) in the final product obtained was calculated.

TABLE 1

| Division | | Water:TEOS40 molar ratio | TEOS40 (g) | EtOH Injection amount (g) | Compound of Formula 1 (g) | $H_2O$ (g) | HCl (g) | Sum of reactants (g) | EtOH produced (g) | EtOH (wt %) | $SiO_2$ content (wt %) | Si molar ratio of polysilicate and compound of Formula 1 |
|---|---|---|---|---|---|---|---|---|---|---|---|---|
| Examples | 1 | 1:1 | 10.000 | — | 0.882 | 0.376 | 0.002 | 11.260 | 0.962 | 8.542 | 39.782 | 9:1 |
| | 2 | 2:1 | 10.000 | — | 0.882 | 0.618 | 0.003 | 11.503 | 1.580 | 13.736 | 38.942 | 9:1 |
| | 3 | 3:1 | 10.000 | — | 0.882 | 0.860 | 0.004 | 11.746 | 2.198 | 18.716 | 38.136 | 9:1 |
| | 4 | 4:1 | 10.000 | — | 0.882 | 1.101 | 0.006 | 11.989 | 2.817 | 23.494 | 37.363 | 9:1 |
| | 5 | 5:1 | 10.000 | — | 0.882 | 1.343 | 0.007 | 12.231 | 3.435 | 28.082 | 36.621 | 9:1 |
| | 6 | 6:1 | 10.000 | — | 0.882 | 1.585 | 0.008 | 12.474 | 4.053 | 32.491 | 35.908 | 9:1 |
| | 7 | 1:1 | 10.000 | — | 1.587 | 0.484 | 0.002 | 12.073 | 1.237 | 10.242 | 33.257 | 5:1 |
| | 8 | 1:1 | 10.000 | — | 1.322 | 0.443 | 0.002 | 11.768 | 1.133 | 9.632 | 35.402 | 6:1 |
| | 9 | 1:1 | 10.000 | — | 1.134 | 0.414 | 0.002 | 11.550 | 1.060 | 9.176 | 36.548 | 7:1 |
| | 10 | 1:1 | 10.000 | — | 0.992 | 0.393 | 0.002 | 11.387 | 1.005 | 8.823 | 38.254 | 8:1 |
| | 11 | 1:1 | 10.000 | — | 0.793 | 0.363 | 0.002 | 11.158 | 0.927 | 8.312 | 39.743 | 10:1 |
| | 12 | 1:1 | 10.000 | — | 0.661 | 0.342 | 0.002 | 11.005 | 0.876 | 7.959 | 39.683 | 12:1 |
| | 13 | 1:1 | 10.000 | — | 1.538 | 0.376 | 0.002 | 11.916 | 0.962 | 8.071 | 37.589 | 9:1 |
| Comparative Examples | 1 | 1:1 | 10.000 | 1.209 | — | 0.242 | 0.001 | 11.452 | 0.618 | 15.957 | 35.201 | — |
| | 2 | 2:1 | 10.000 | 2.418 | — | 0.484 | 0.003 | 12.905 | 1.237 | 28.321 | 31.239 | — |
| | 3 | 3:1 | 10.000 | 3.627 | — | 0.725 | 0.004 | 14.357 | 1.855 | 38.185 | 28.079 | — |
| | 4 | 4:1 | 10.000 | 4.837 | — | 0.967 | 0.006 | 15.810 | 2.473 | 46.236 | 25.500 | — |
| | 5 | 5:1 | 10.000 | 6.046 | — | 1.209 | 0.007 | 17.262 | 3.091 | 52.932 | 23.354 | — |
| | 6 | 6:1 | 10.000 | 7.255 | — | 1.451 | 0.008 | 18.714 | 3.710 | 58.588 | 21.542 | — |
| Reference Example | 1 | 1:1 | 10.000 | — | 0.496 | 0.317 | 0.002 | 10.815 | Reactants do not mix | | | 16:1 |

As can be seen in Table 1, in Examples 1 to 13, ethanol was effectively produced through the hydration reaction of methyltriethoxysilane (MTES) or triethoxy (propyl) silane, which is a compound of Formula 1, without injecting a separate ethanol solvent, and through this, the hydration reaction of the ethyl polysilicate could be performed. Examples 1 to 6 are examples in which the injection amount of the acidic aqueous solution (HCl) was gradually increased, and by a method of controlling the amounts of the water and the acid catalyst included in the acidic aqueous solution, the hydration degree of the polysilicate obtained could be controlled.

Comparative Example 1 is an example of injecting a minimum amount of ethanol to break the layer separation between the polysilicate and the acidic aqueous solution to mix ethyl polysilicate and the acidic aqueous solution clearly. Comparative Examples 2 to 6 are examples increasing the injection amount of the acidic aqueous solution and accordingly, increasing the injection amount of ethanol required, and are examples in which an ethanol solution was separately injected for the reaction of the polysilicate and the acidic aqueous solution, different from the Examples.

If Examples 1 to 6 and Comparative Examples 1 to 6 are compared as examples injecting the same molar ratio of water and polysilicate (TEOS40), it could be confirmed that Examples 1 to 6 could prepare pre-hydrolyzed polysilicates having the higher $SiO_2$ contents than Comparative Examples 1 to 6 though using the same ratio of water and polysilicate. Examples 1 to 6 according to embodiments of the present invention show effects shown by using an alcohol compound produced by the decomposition of the compound of Formula 1 into an alcohol compound and a silanol compound, as an amphipathic solvent, and these effects are differentiated from the conventional method of preparing a pre-hydrolyzed polysilicate wherein the use of a separate alcohol compound is required to use as an amphipathic solvent, though an alcohol compound produced during the reaction remains in a final product, and a pre-hydrolyzed polysilicate having a low concentration of the $SiO_2$ content is prepared.

Meanwhile, referring to Examples 7 to 11, it could be confirmed that the $SiO_2$ content changes according to the Si molar ratio of the polysilicate and the methyltriethoxysilane (MTES) that is the compound of Formula 1, and it could be confirmed that the $SiO_2$ content in a final product could be controlled by controlling the Si molar ratio of the polysilicate and the methyltriethoxysilane (MTES) that is the compound of Formula 1 in a suitable range. By increasing the mole number of Si included in the polysilicate compared to the mole number of Si of the compound of Formula 1, the $SiO_2$ content in a final product tended to increase.

Reference Example 1 showed an example not performing the hydration reaction of step 3 of the present invention, because the injection amount of the compound of Formula 1 was small compared to the polysilicate. As in Reference Example 1, if the mole number of Si included in the polysilicate is excessively increased greater than a certain range compared to the mole number of Si of the compound of Formula 1, the interface between the polysilicate and the acidic aqueous solution is separated, and the reactants are not mixed to not perform the reaction, or the reaction cannot be performed smoothly due to the lack of the amount of the alcohol, and accordingly, the effects of reducing the synthesis time of the pre-hydrolyzed polysilicate and the effects of synthesizing the pre-hydrolyzed polysilicate without using a separate solvent of the present invention could not be shown.

As described above, Examples 1 to 13 have advantages in that a separate ethanol solvent is not used to show the possibility and effects of reducing the total amount of the reactants used for the hydration of the polysilicate when compared to the conventional case of using an ethanol solvent, and the hydration of the polysilicate could be effectively performed.

It will be understood by one of ordinary skill in the art that a person having ordinary skill in the art to which the present disclosure pertains may be easily modified in other specific forms without changing the technical spirit or essential features of the present disclosure. Therefore, it should be understood that the embodiments described above are illustrative in all respects and are not limiting.

The invention claimed is:

1. A method of preparing a pre-hydrolyzed polysilicate, the method comprising:

injecting a polysilicate and a compound of the following Formula 1 into a reactor (step 1);

further injecting an acidic aqueous solution into the reactor to prepare a reaction mixture (step 2); and stirring the reaction mixture to perform a hydration reaction (step 3), wherein the polysilicate and the compound of Formula 1 have a Si molar ratio of 6:1 to 15:1:

$$R_1—Si—(OR_2)_3 \quad \text{[Formula 1]}$$

wherein:

$R_1$ is an alkyl of 1 to 20 carbon atoms, cycloalkyl of 3 to 20 carbon atoms, or a vinyl group; and each $R_2$ is independently an alkyl of 1 to 20 carbon atoms.

2. The method of claim 1, wherein the compound of Formula 1 is hydrated to form an alcohol compound of the following Formula 2 and a silanol compound of the following Formula 3:

$$R_2—OH \quad \text{[Formula 2]}$$

$$R_1—Si—(OH)_3 \quad \text{[Formula 3]}$$

wherein:

$R_1$ is an alkyl of 1 to 20 carbon atoms, cycloalkyl of 3 to 20 carbon atoms, or a vinyl group; and $R_2$ is an alkyl of 1 to 20 carbon atoms.

3. The method of claim 1, wherein the hydration of the polysilicate in step 3 is performed in the presence of an alcohol compound of Formula 2 formed by the hydration of the compound of Formula 1:

$$R_2—OH \quad \text{[Formula 2]}$$

wherein $R_2$ is an alkyl of 1 to 20 carbon atoms.

4. The method of claim 1, wherein $R_1$ and $R_2$ are each independently an alkyl of 1 to 6 carbon atoms.

5. The method of claim 1, wherein the compound of Formula 1 is alkyltrialkoxysilane.

6. The method of claim 1, wherein the acidic aqueous solution comprises 0.005 to 0.20 parts by weight of an acid catalyst based on 100 parts by weight of the polysilicate.

7. The method of claim 1, wherein the polysilicate has an average degree of polymerization of 3 to 30.

8. The method of claim 1, wherein step 3 is performed for 30 minutes to 2 hours in conditions of 15 to 25 °C.

9. The method of claim 1, wherein a separate alcohol solvent is not injected in addition to the polysilicate and the compound of Formula 1 to the reactor in the preparation method of a pre-hydrolyzed polysilicate.

10. The method of claim 1, wherein the polysilicate comprises one or more selected from the group consisting of methyl polysilicate, ethyl polysilicate, propyl polysilicate, isopropyl polysilicate, butyl polysilicate, sec-butyl polysilicate, tert-butyl polysilicate, hexyl polysilicate, cyclohexyl polysilicate, and dodecyl polysilicate.

11. The method of claim 1, wherein the compound of Formula 1 comprises one or more selected from the group consisting of alkyltriethoxysilane and alkyltrimethoxysilane.

12. The method of claim 1, wherein the compound of Formula 1 is methyltriethoxysilane.

13. The method of claim 1, wherein the compound of Formula 1 is alkyltriethoxysilane, the alkyltriethoxysilane is hydrated to form an alkylsilanol and ethanol, and the hydration of the polysilicate in step 3 is performed in the presence of the ethanol formed by the hydration of the alkyltriethoxysilane.

* * * * *